United States Patent

[11] 3,620,539

| [72] | Inventors | Maceo M. Lanier;<br>Nathan P. Williams, both of Huntsville, Ala. |
|---|---|---|
| [21] | Appl. No. | 754,882 |
| [22] | Filed | Aug. 23, 1968 |
| [45] | Patented | Nov. 16, 1971 |
| [73] | Assignee | The United States of America as represented by the Secretary of the Army |

[54] MOISTURE-PROOF WIRE HOLDER
2 Claims, 2 Drawing Figs.

[52] U.S. Cl. .................................................. 277/63,
174/151, 277/182, 285/158
[51] Int. Cl. ...................................................... F16j 15/10
[50] Field of Search............................................ 277/63,
181–186, 189; 174/153, 153 G, 151, 152 R;
285/158, 161, 213, 217; 16/2, 108, 109; 24/155
BB, 155 SB, 255 RS; 85/36

[56] References Cited
UNITED STATES PATENTS

| 2,447,489 | 8/1948 | Clark............................ | 174/153 |
| 2,595,878 | 5/1952 | Parsons........................ | 277/183 X |
| 2,666,805 | 1/1954 | Smith............................ | 174/153 |
| 3,331,914 | 7/1967 | Kavinsky....................... | 285/158 X |
| 2,186,934 | 1/1940 | Palmer.......................... | 16/2 UX |
| 2,382,520 | 8/1945 | Tinnerman.................... | 85/36 |
| 2,775,917 | 1/1957 | Ferguson....................... | 85/36 |
| 2,798,405 | 7/1957 | Steck............................. | 85/36 |
| 2,798,406 | 7/1957 | Steck............................. | 85/36 |
| 2,802,204 | 8/1958 | Kennelly et al................ | 174/153 UX |
| 1,030,306 | 6/1912 | Hull............................... | 285/161 |
| 2,657,703 | 11/1953 | Bletcher........................ | 285/161 X |

*Primary Examiner*—Edward J. Earls
*Attorneys*—Harry M. Saragovitz, Edward J. Kelly, Herbert Berl and Charles R. Carter ABSTRACT: A moistureproof wire holder for attachment to a panel and for holding wires in a fixed position when the wires are passed through a hole of substantially equal diameter in the panel. The holder is a two part device, one part placed on each side of the panel. Each part is made of a silicone rubber member fitted into a recess portion of a plastic or metal clamp. The clamps exert a spring action on the wires to resist movement away from the panel, thereby compressing the rubber into a moistureproof seal between the clamp and the panel. The silicone rubber also maintains a positive moisture seal around the wire.

PATENTED NOV 16 1971

3,620,539

Maceo M. Lanier
Nathan P. Williams,
INVENTORS.

BY Harry M. Saragovitz
Edward J. Kelly
Herbert Berl
Charles R. Carter

MOISTURE-PROOF WIRE HOLDER

BACKGROUND OF INVENTION

This invention relates to the field of holders for wires passing through panels. The known holders have presented a problem in passing wires through panels. It is often necessary to pass wires through a panel that separates two compartments and at the same time prevent any moisture leakage from one compartment into the next. Various cements having different curing times and properties have been used to seal the holes at the panel. This problem is further complicated by the fact that cements have various deterioration periods, after which they lose their sealing effect and any relative movement between the wires and panel tends to loosen the cement. Further sealing problems have been encountered in cases where Teflon-coated wires or other difficult to cement insulations have been used.

SUMMARY OF THE INVENTION

The present invention has provided a novel solution to the above-mentioned problem through the use of a holder including two flexible clamps and compressible material used with each clamp. A clamp and its associated compressible material is located on each side of a panel. When a wire is passed through an opening in the panel, and the holder is assembled on the wire, the clamps tension the wire and force the compressible material against the panel and around the wire to provide a moistureproof seal.

This invention may be better understood from the following detailed description taken in conjunction with the accompanying drawings.

DESCRIPTION OF PREFERRED EMBODIMENT

Figure 1:
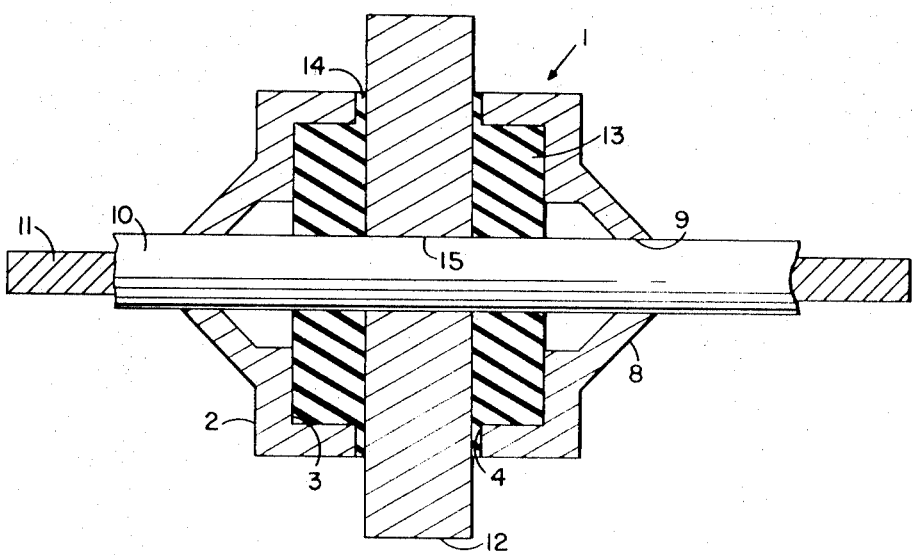
FIG. 1 is an elevation view showing a panel with a wire projecting through a hole of substantially equal diameter in the panel and a moistureproof wire holder with the clamps on opposite sides of the panel.
Figure 2:
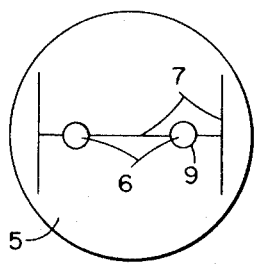
FIG. 2 shows an end view of the clamp.

FIG. 1, shows a holder 1 consisting of two flexible plastic or metal clamps 2 having recesses 3 encircled by peripheral edges 4. FIG. 2 shows face 5 of the clamps with openings 6, having a diameter smaller than the members such as wires used and slits 7 connected to these openings. The slits assist the clamps to open when the larger size wires are pushed through. In FIG. 1, reference numeral 8 shows the clamps in a truncated cone shape after the wires have been pushed through the compressible material and out of the openings of the clamps. Each opening 6 has an edge 9 that defines the openings and the edges, when expanded by insulation 10 and wires 11 tend to lock or grip the clamps to the wire and insulation by exerting a spring action on the insulation to resist any movement of the wires with respect to the clamps and panel 12 or other mounting surface. Due to the inherent nature of compressible material 13, a positive sealing action takes place between the wire insulation and the rubber after the wires are pushed through the rubber. The compressible material is partially fitted into recess 3 of the clamps and has overlapping portions 14 overlapping peripheral edges 4. When the clamps are mounted on the panel as shown in FIG. 1, the clamps establish a tension on the wires to provide a compression force on the overlapping portions. This compression force effects a positive moistureproof seal between the insulation and the opening in the panel. The compressible material is simultaneously forced against the insulation and the opposite faces of the panel to provide resistance to any longitudinal movement of the wires with respect to the clamps and panel 12 or other mounting surface. When metal clamps are used, overlapping portions 14 eliminate the danger of an electrical short to the panel should the metal clamps wear through the insulation and contact the wire.

The operation of the moistureproof wire holder is a follows: After a wire has been passed through an opening 15 in the panel, it is pushed through the compressible material and the clamps. The clamps force the compressible material against the panel to provide a moisture seal between the clamps and the panel and also engages wire insulation 10 to lock the clamps in position. The compressible material seals around the insulation of the wires and provides a moisture seal at this point.

We claim:

1. A device for providing a moistureproof joint between a panel with a hole therein and a member projecting through said hole with the diameters of said member and hole substantially equal comprising: a pair of cup-shaped flexible clamps, each having a rear wall with a generally cylindrical sidewall extending therefrom and having gripping means defining edges formed in said rear wall, said cup-shaped clamps being disposed about said member on either side of said panel, and a body of compressible material received within each of said cup-shaped clamps such that said compressible material is held in sealing engagement with said panel and said member by said rear wall and said sidewall when each of said clamps is mounted on said member; said clamps and said compressible material being held in position on said member by the gripping engagement of said edges with said member, whereby compression of said material against said member and against the opposite surfaces of said panel is effected to provide moistureproof joints therebetween.

2. A device as in claim 1 wherein the rear wall of each of said clamps includes resilient portions forming said gripping means, which resilient portions are provided with openings smaller than the cross section of said member and engagement portions including peripheral edges disposed for constraint of said compressible material; said resilient portions being disposed for opposed gripping relation with said member and said engagement portions being disposed for respective compression of said material toward said opposing surfaces and said member responsive to the compression to provide moistureproof joints therebetween.

* * * * *